United States Patent
Kelley et al.

(10) Patent No.: US 7,225,272 B2
(45) Date of Patent: May 29, 2007

(54) METHOD AND APPARATUS FOR PROVIDING NAME SERVICES

(75) Inventors: Winslow B. Kelley, Natick, MA (US); Edward L. Abrams, Worcester, MA (US); Yuti Ito, Belmont, MA (US)

(73) Assignee: Web.com, Inc., Atlanta, GA (US)

( * ) Notice: Subject to any disclaimer, the term of this patent is extended or adjusted under 35 U.S.C. 154(b) by 800 days.

(21) Appl. No.: 10/210,205

(22) Filed: Jul. 31, 2002

(65) Prior Publication Data

US 2004/0024872 A1 Feb. 5, 2004

(51) Int. Cl.
*G06F 15/16* (2006.01)
(52) U.S. Cl. .................................. 709/245; 707/104.1
(58) Field of Classification Search ................. 709/245; 707/104.1
See application file for complete search history.

(56) References Cited

U.S. PATENT DOCUMENTS

| | | | | |
|---|---|---|---|---|
| 5,974,453 A * | 10/1999 | Andersen et al. | ........... | 709/220 |
| 6,104,711 A * | 8/2000 | Voit | ........................... | 370/352 |
| 6,154,777 A * | 11/2000 | Ebrahim | ...................... | 709/227 |
| 6,202,087 B1 * | 3/2001 | Gadish | ........................ | 709/206 |
| 6,324,585 B1 * | 11/2001 | Zhang et al. | ............... | 709/245 |
| 6,442,602 B1 * | 8/2002 | Choudhry | .................... | 709/218 |
| 6,769,031 B1 | 7/2004 | Bero | ........................... | 709/245 |
| 6,895,431 B1 | 5/2005 | Bero | .......................... | 709/220 |
| 6,973,507 B2 * | 12/2005 | Yoon et al. | ................. | 709/245 |
| 2001/0052016 A1 * | 12/2001 | Skene et al. | ................. | 709/226 |
| 2003/0009592 A1 * | 1/2003 | Stahura | ...................... | 709/245 |
| 2003/0074472 A1 * | 4/2003 | Lucco et al. | ................. | 709/245 |

* cited by examiner

*Primary Examiner*—Zarni Maung
*Assistant Examiner*—Alan Chou
(74) *Attorney, Agent, or Firm*—Thomas, Kayden, Horstemeyer & Risley, LLP

(57) ABSTRACT

An embodiment of the invention comprises a method and apparatus for providing dynamic name resolution services based on information stored and served in a root server. A multi-part reference to the name resolution server is stored on the root servers. By analyzing the reference to the name resolution server, the name resolution server is capable of dynamically generating a canonical name associated with a domain and/or a host name. The domain and/or host name may be further examined by network resource servers to determine further information about a requested resource.

27 Claims, 7 Drawing Sheets

METHOD AND APPARATUS FOR PROVIDING NAME SERVICES

FIELD OF THE INVENTION

This invention relates to the field of computer software. More specifically, the invention relates to a method and apparatus for providing name services, allowing for enhanced manageability and configurability of name services on a network of computers.

BACKGROUND

In order for a computer to be part of a network, it must have a unique identity so that messages can be properly routed to the computer or network node. On the Internet network, for example, the address is represented in accordance with the Internet Protocol (IP) address. In the Internet Protocol each network node maybe represented with a numerical address. In version four of the Internet Protocol (Ipv4), the numerical address is a thirty two (32) bit address used in combination with a 32 bit mask number to define sub-networks accessible from and by the address in question. By convention, the 32 bit address and the mask is represented as "x.y.z.a", where x, y, z and a may take any number between 0 and 255.

For humans it is much more convenient to utilize textual references to identify network locations than a numerical address. Therefore, to be able to utilize textual names alongside numbers, an infrastructure is required to provide name resolution whenever necessary. For example, a name resolution system has been implemented to provide name resolution in order to access the Internet. The system is commonly referred to as the Domain Name Service (DNS).

The Domain Name Service is a distributed database that includes the capability of translating Internet addresses to facilitate the location of computers connected to the Internet. A DNS name server translates a numerical address, assigned to a particular computer, into a sequence of words and vice versa. The word-based address is far more commonly used by people than the numerical address in order to make the address easier to remember and enter into a computer. The word-based address, for example, "president.whitehouse.gov", is translated into a numerical address that consists of four sets of numbers separated by periods, for example, "198.137.240.92", by the DNS system.

DNS names, by convention, are words written in lowercase letters with the words separated by periods, where the words refer to "domain" and "sub-domain" names. Each domain has a unique name and can be broken into a number of subdomains, with the responsibility for the subdomains residing the organization corresponding to the particular domain. The subdomain is the name of a computer host or an Internet provider and it may consist of several parts, or what amount to additional levels of subdomains. The DNS names take the form of "subdomain.domainname" (for example: "whitehouse.gov" or "cs.ucla.edu"), where the "domainname" represents a domain of the database, also referred to as a directory, partition or zone. Typically, the domain name indicates the type of organization. Common domain names include "corn" (for commercial organization), "net" (for networking organization), "edu" (for educational institutions) and "gov" (for the U.S. Federal government, the original sponsor of the Internet). Each domain and subdomain combination is referred to as a different zone. For example, in "cs.ucla.edu", there is a edu zone, a ucla.edu zone and a cs.ucla.edu zone.

The DNS distributed database is indexed by the domain names and these provide paths in a large inverted tree structure, called the domain name space. At the top of the inverted tree, there is a single root with a limit of 127 levels from the root to the lowest level domain name.

The DNS system is really a DNS client-server system, where the name servers are computer programs that constitute the server side of the DNS client-server system. Information about some portions of the database is made available by the name servers to clients, called "resolvers" that often create queries and send them across a network to a name server. Programs running on a host computer, that require information from the domain name space, obtain the information from the resolvers, which access the name servers at different levels in the inverted tree. In addition to querying a name server, the resolver interprets the response and returns the information requested to the program that made the request. If the query is not answered, the resolver may resend the request and it may include a cache to store name related data retrieved previously from the name servers.

Root name servers are name servers at the root of a domain name, near the top of the inverted tree, and they are able to locate the "authoritative" name servers for the top level zones in the inverted tree. A name server is "authoritative" for servers under it on the tree because it knows the names of the servers at least one level under it on the tree. Thus, the top level root servers can provide the list of authoritative second level zone name servers. The second level zone name servers can provide the list of authoritative lower level name servers. Requests for addresses thus travel from level to level progressively through the tree structure until they are resolved and the necessary information is then returned to the requestor along the same path.

A host computer (or a cluster of computers) has one or more unique IP addresses, and one or more domain names, that identify the computer to other computers and users on the network. At the end of name resolution by the name services server, a host name is resolved into a numerical address.

The actual Internet address is used in the form of a URL (Uniform Resource Locator). URLs may use the IP address in either the numerical format or the word based address discussed earlier. An example of this convention is "http://www.whitehouse.gov". The "http" indicates the use of the hypertext transfer protocol for access to the particular location on the Internet. Name servers map the IP numbers to domain names (gov) and subdomain names (whitehouse) in the above URL on the world wide web (www) and guarantee that the correct IP number of the source and the destination are provided for all transmitted data packets.

The present DNS system for the Internet can become very complex for firms providing host computers, such as Internet service providers, because of the use of multiple servers that must be synchronized. Frequent address changes must be constantly updated in hosting firms' very large local DNS databases and the servers must be synchronized so that hosting firms' customers' web sites can be located. What is needed is a way to locate web and user domains on a web server and for emails without a local database. There is a need for a way to be a mass host of domain names for users of hosting services without having a large local database of domain information.

SUMMARY OF THE INVENTION

Figure 1:
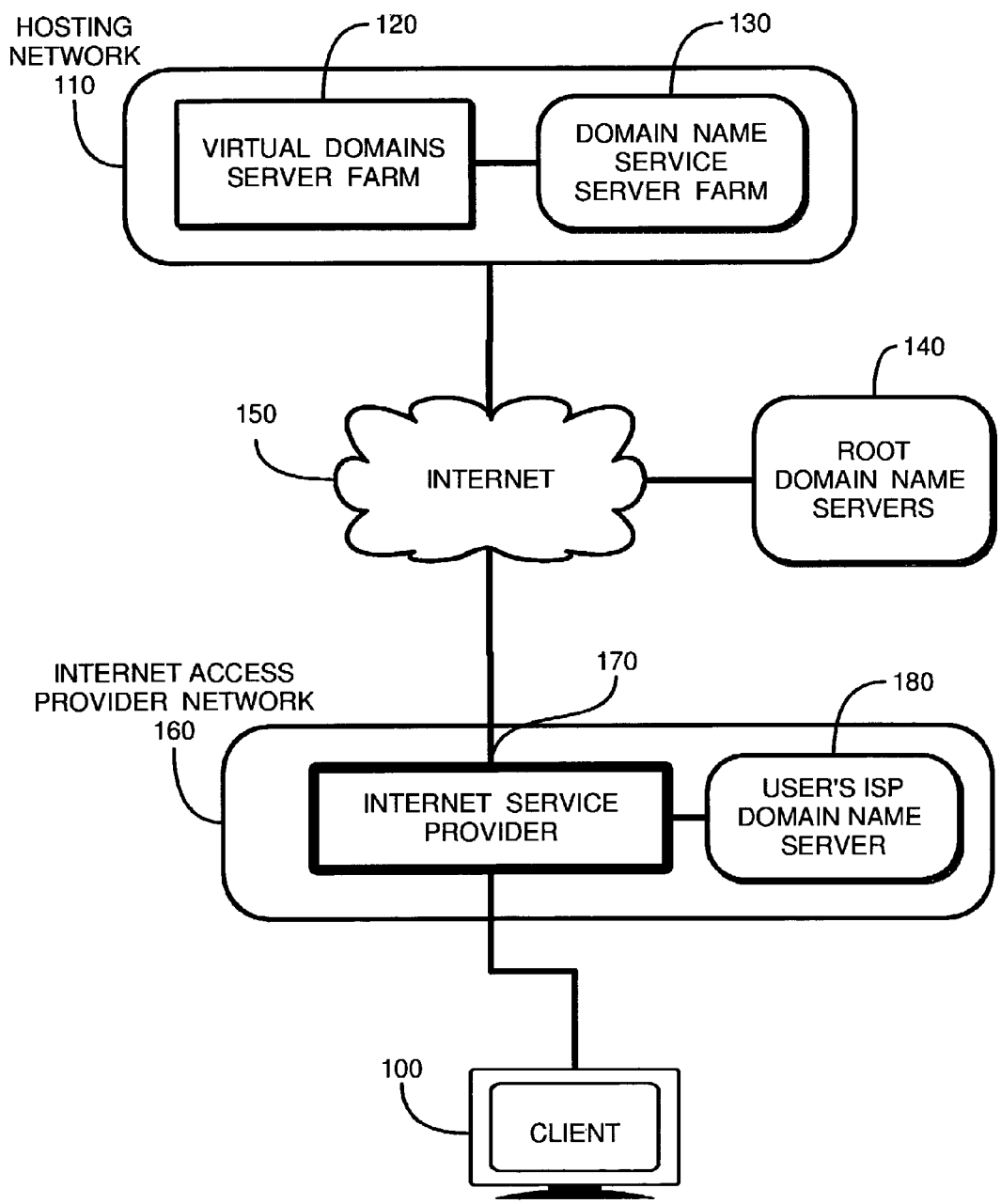
FIG. 1 is a block diagram illustrating a typical setting for name resolution in embodiments of the invention.

The invention is a method and apparatus for providing name services for servers and clients in a network of computing devices, without requiring the use of a database for mapping each name on the network to a corresponding numerical address. Embodiments of the invention utilize a multi-part registration name that is associated with the name resolution service server. When the name resolution service server receives a request to resolve a domain name, it fetches the reference of the name resolution service server associated with the domain name in question. The name resolution server parses the reference and dynamically generates a canonical name that may be analyzed and interpreted by other network computers to perform network tasks. The canonical name may be looked up on a name server to obtain a numerical address. Embodiments of the invention comprise application modules specialized in requesting the canonical names from name resolution servers, and mapping the information contained in the canonical name to resource properties.

In existing name resolution systems a root server provides a reference to a name resolution server. The name resolution server contains a database where each host and domain has an association with one or more numerical addresses. In embodiments of the invention, the name resolution server is enabled to dynamically generate a canonical name based on the information stored in the reference to the name resolution server. A second request to a name resolution server to resolve the canonical name returns a numerical address associated with the domain name addressed in the canonical name. The canonical name maybe resolved by the same name resolution server, or by a different name resolution server. Therefore, embodiments of the invention allow for resolving domain names without requiring a database for mapping between each registered domain name and a numerical address.

DETAILED DESCRIPTION

The invention is a method and apparatus for providing name services for servers and clients in a network of computing devices. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Computers in a network (e.g., the Internet) communicate with one another using numerical addresses to identify the network location of a particular node. The addressing follows one or more protocols, such as Internet Protocol Version 4 (IPv4) and Internet Protocol Version 6 (IPv6). However, humans generally find textual addresses (e.g., names) more suitable than numerical addresses to address objects and locations. In order to allow humans to use textual references to network locations and computers to use numerical addresses, the network infrastructure provides services for mapping textual references into numerical addresses and provides the mapping to clients that automatically handle the name resolution process. For example, modern web browsers, such as Netscape Navigator and Microsoft Internet Explorer, allow users to access world wide web sites by entering a web site domain name (e.g., www.somedomain.ext). The browser then resolves the domain name to a numerical address utilizing the name resolution services supported by a network of computers.

Network location textual references may be represented in accordance to a set of rules that are part of a specific protocol. For example, dot-separated multi-string names are used in accordance to the Internet Protocol. Internet location names are represented at the right end of the name by a string that indicates a root name such as "com", "org", the two-character country codes representation etc. The next strings added to the left end represent a hierarchy of sub-domains. Usually, the string at the left most end represents a host name.

Throughout the disclosure, the term "server" is utilized to refer to hardware, including a number of physical machines virtually linked together to act as a single functional entity hosting one or more services. The term server farm is also used to refer to a cluster of machines including servers, routers firewalls and every equipment necessary to build a cluster of servers.

The term "server" is commonly loosely utilized in the art of computers to refer to the hardware (the physical machines) running one or more computer programs that serve data and to the computer programs serving data. In the following, the term "service" refers to the function (e.g., name resolution service) provided by a server and the term "server" will be used to refer to the machines providing the service. However, as it is common in the art of network services, the term "server" may be permutably utilized in the disclosure to refer to the service or to the machines providing the service when the distinction is not critical to the description of the subject matter. For example, a client making a connection to a name resolution server should mean that a client machine makes a network connection to a machine running a name resolution service; and in particular the network connection is made with the name resolution service.

Throughout the disclosure, examples of domain names will end with a ".ext" which refers to root domains such as ".com", ".net", ".org", the two letter country codes and other existing and future root domains.

In embodiments of the invention, each step of the computation and data serving may involve the process of caching data or a result of a computation. Systems implementing the invention are also configurably enabled to serve data from an internal or an external cache, or generate a result de novo.

FIG. 1 is a block diagram illustrating a typical setting for name resolution in embodiments of the invention. A user uses a network client computer 100 to access a resource on a hosting network 110. In embodiments of the invention, the client computer 100 provides a user interface to access network applications. Network applications refer to any application capable of accessing resources through a network. A typical example of a network application is a world wide web browser (e.g., Microsoft's Internet Explorer and Netscape's Navigator) that supports, in addition to Hypertext Markup Language data rendering, one or more data transfer protocols such as the Hypertext Transfer Protocol and the File Transfer Protocol. Other examples of network applications are the electronic mail client and server applications, each supporting multiple network protocols for sending and receiving electronic mail, name resolution client and server applications, and any computer program capable of communicating through a network.

In a typical setting, such as the one illustrated in FIG. 1, the client 100 is connected to a proximal network 160. The proximal network is typically an Internet Service Provider (ISP) network to which the client machine connects utilizing an analog telephone line link, a Digital Subscriber Link, wireless links or any other means for connecting a computer to a network. The service provider's network 160 typically combines one or more machines that act as gateways 170 for the clients to access the Internet 150. The Internet Service Provider's systems may also provide a combination of services. In embodiments of the invention, systems in the Internet Service Provider's network 160 provide a name resolution service through any number of hosts for resolving domain names 180. FIG. 1 shows a resource location, a virtual domains server farm 120. The resource location may combine any number of servers hosting any number of virtual locations. Examples of resource servers are servers that serve HTML pages through the Internet. The resource servers are typically located in a hosting network 110 environment that provides, in addition to resource serving, one or more other services such as electronic mail and, more importantly for the invention, name resolution services through a domain name service server farm 130.

When a user enters a reference in a network application to access a resource through the network, the first function the application performs is to retrieve the numerical address that corresponds to the textual reference. To allow users to access network resource using textual references, a server with the appropriate mapping is required in existing systems.

The infrastructure that supports name resolution involves a central authority, or root domain name server, 140 that is accessible to any client of server connected to the Internet. The central authority provides numerical addresses corresponding to domain names, and, most frequently, a reference to a name resolution server instead. To this end, each existing domain name intended to be accessed on the Internet has to be registered with a central authority. Furthermore, an address mapping has to be registered with the root servers, where the term address mapping refers to one or more textual references and the corresponding numerical addresses of one or more servers. A proximal name resolution server 180, which is typically provided as a service along with the access to a network, obtains a reference to a remote (or distal) name resolution server 130 that is typically part of the resource hosting network. The proximal name resolution server submits a request to the remote name resolution server to resolve the domain name obtained from the user. The remote domain name resolution system, or domain name service server farm, 130 returns a numerical address to the resource server, or virtual domains server farm 120. The client 100 then accesses the resource server 120 using the numerical address to make one or more network connections and submits the URL to request the resource from the server. The resource server then returns the data.

When a user attempts to access a resource through the Internet (e.g., from client 100 to access a resource on server 120), the user typically enters a textual reference such a Uniform Resource Locator (URL) in a network application. Entering a textual reference may be performed by literally typing text, clicking on a hyper-link, issuing a voice command or performing any other action that results in submitting a textual reference to access a resource. The network application parses the URL to extract the part that refers to a domain name and attempts to resolve the textual reference (address) into a numerical address. The network application typically uses a resolver. The resolver is a service provided by the client's operating system or a helper application, running on the client machine, that mediates name resolution for applications running on the same client. The resolver requests a name resolution for the textual reference from a proximal domain name service host 180, also referred to as the user's ISP domain name server. The proximal domain name service host connects the central authority root domain name servers 140 to request a resolution of the textual reference. The central authority typically returns a reference to the domain name service host that stores and serves the information about the domain name in question. For example, a user tries to contact a resource on a remote server with the URL text: http://www.somedomain.ext/resource_name.html. The network application parses the URL text and determines that the resource is located on a server referenced by the domain name www.somedomain.ext, and the resource is accessible using the Hypertext Transfer Protocol (HTTP). The local resolver accesses a proximal name resolution system 180 that takes on the task of requesting a name resolution from a root server 140. The root server returns the address of a remote name resolution system 130 that hosts the mapping for the domain name. The proximal name resolution system 180 then issues a request to the remote name resolution system 130 to resolve the domain name into a numerical address. The proximal name resolution system then returns the result to the local resolver that in turn returns the results to the network application.

It is important to note that in existing name resolution systems, a database, configuration file or a simple algorithm provides the mapping between the domain name in the request and the resource on the resource server. For example, the request "http://www.joe.ext/resource_name.html" might be mapped by the server via a table lookup to the file resource_name.html in a storage location "/www/users/jsmith" on the resource server, while a request such as "http://www.bill.ext/resource_name.html" might be mapped by the server to a different file by the same name in the storage location "/www/users/bjones". This approach is commonly referred to as "virtual hosting". In embodiments of the invention, the request "http://jsmith.pages.hostingsite.ext/resource_file.html" could be mapped algorithmically to "resource_name.html" In storage location "/www/users/jsmith", and "http://bjones.pages.hostingsite.ext/resource_file.html" could mapped to a file by the same name located in storage location "/www/users/bjones". Existing implementations have used these or similar techniques based on resources available within the hosting network 110. In the following, a detailed description is provided for a system and method for performing resource mappings without relying on a local stored database, or simple substitution algorithm.

Figure 2:
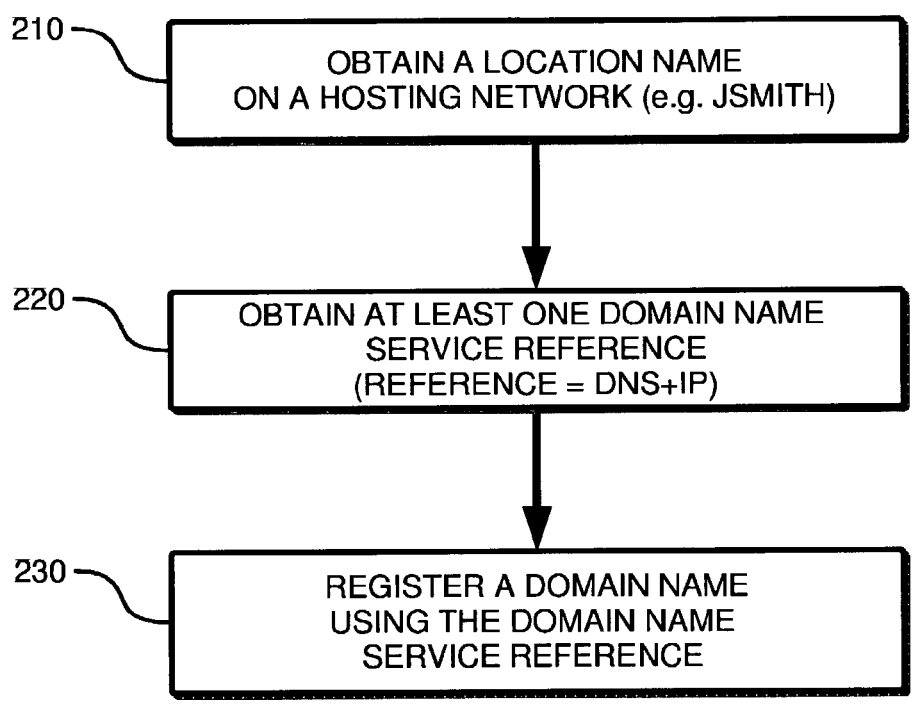
FIG. 2 is a flowchart illustrating steps involved in the registration process of a network domain name in accordance with embodiments of the invention.

FIG. 2 is a flowchart illustrating the steps involved in the registration process of a network domain name in accordance with embodiments of the invention. At step 210 a user, where a user may also be a process executing one or more method steps, obtains a name on a hosting network. For example, a user, intending to use an embodiment of the invention, creates a location for storing the resources intended to be accessed through a domain name (e.g., domainname.ext). The storage location may be referred to as "jsmith". The user and/or the resource hosting service utilizing embodiments of the invention may also use multi-part names such as "jsmith.pages" and "jsmith.secure.pages".

At step 220, the user obtains at least one domain name service reference. In embodiments of the invention, the user combines the name obtained from the reference to a storage location with the domain name of the ISP and the intended domain name to registered. For example, with a hosting service named "isp.ext" and a registered domain name "joe.ext" combined with the previously obtained name, a user may compose a textual reference to a first name server written as "isp.ext.jsmith.pages1.ns.joe.ext" and to a second name server written as "isp.ext.jsmith.pages2.ns.joe.ext". At step 230, a user registers the domain name "joe.ext" using the domain name service reference with the central authority providing the name servers and, for each name server, obtains a numerical address of servers that provide name resolution services for the domain in question.

Figure 3:
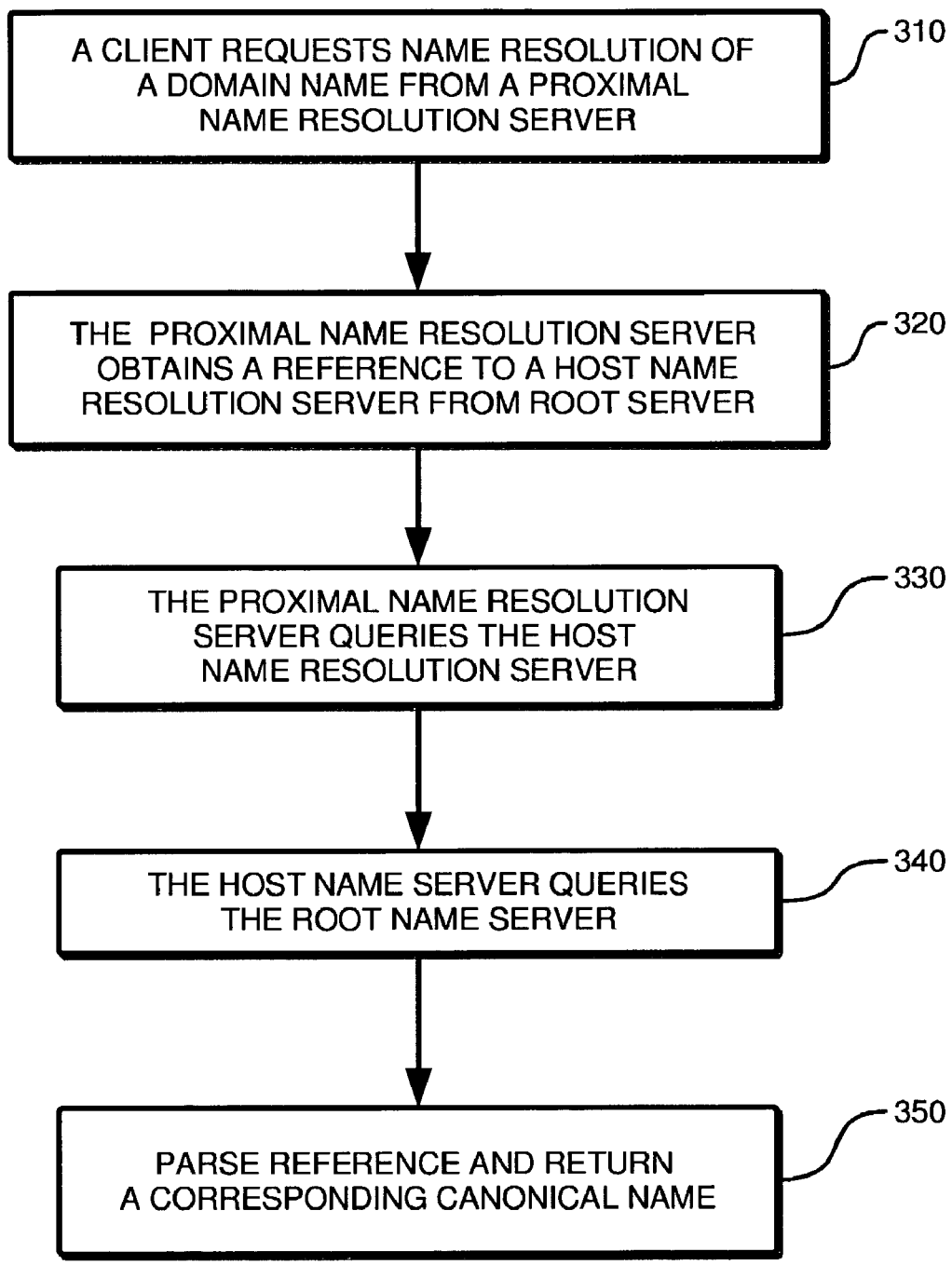
FIG. 3 is a flowchart illustrating steps involved in resolving a domain name from a textual network reference into a numerical address in accordance with embodiments of the invention.

FIG. 3 is a flowchart illustrating steps involved in resolving a domain name from a textual network reference into a numerical address in accordance with embodiments of the invention. At step 310, a client requests name resolution from a proximal domain name resolution server. The proximal name resolution server queries a root server on behalf of the client to determine the numerical address or the reference to the name resolution server hosting the name resolution service for the domain name in question at step 320. The root server returns (if available) a reference to the name resolution server hosting name services for the domain name. Following the previous example from FIG. 2, the root server returns one or more textual references (e.g. ,isp.ext.jsmith.pages1.ns.joe.ext) and their corresponding numerical addresses, in response to a query to resolve the domain name "joe.ext". At step 330, the proximal name resolution server uses the numerical address to access the host name resolution server and submits a query to resolve the domain name (e.g. joe.ext) into a numerical address. At 340, the host name resolution server, after receiving the query to resolve the domain name in question, requests a name resolution for the domain from the root name server. Querying the root name server for a name resolution server reference is mainly directed, in embodiments of the invention, at obtaining the compound textual reference that is registered in the root domain name server (e.g., isp.ext.jsmith.pages1.ns.joe.ext) with the domain name (e.g., joe.ext). At step 350, the host name resolution server parses the reference obtained from the root server and dynamically generates a canonical name. For example, the host name resolution server 130 may parse "isp.ext.jsmith.pages1.ns.joe.ext" into several parts. The first one "isp.ext" may be utilized in embodiments of the invention to check that the hosting domain is correctly referenced in the root server. In the latter case, "isp.ext" indicates that the name resolution reference points to the correct hosting domain 110. A second part, such as "joe.ext" of the reference, may be utilized to determine the base domain name for the name resolution is requested. A third part, such as "jsmith.pages1", of the reference may be utilized to determine the storage location that can be used to locate resources. In embodiments of the invention, the host name resolution server 130 dynamically generates a canonical name by combining one or more parts of the host name resolution reference. For example, the reference "isp.ext.jsmith.pages1.ns.joe.ext" may be utilized to dynamically generate a canonical name such as "jsmith.pages1.isp.ext". The latter canonical name may then be resolved to a numerical address through a single mapping of the hosting domain or one or more of its subdomains (e.g., pages1.isp.ext).

Figure 4A:
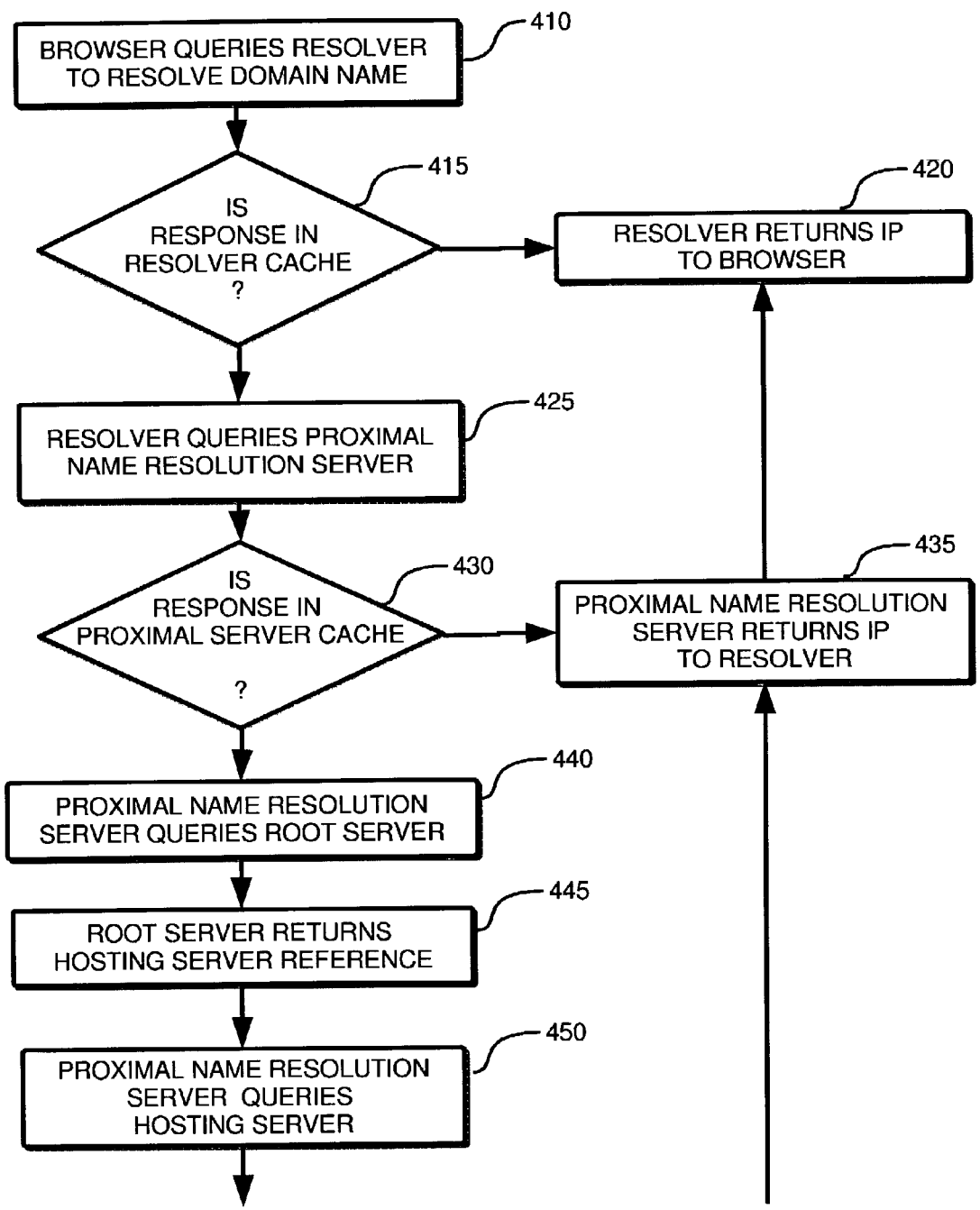
FIGS. 4A and 4B are flowcharts illustrating steps involved in completing a document retrieval from a remote server in accordance with embodiments of the invention.
Figure 4B:
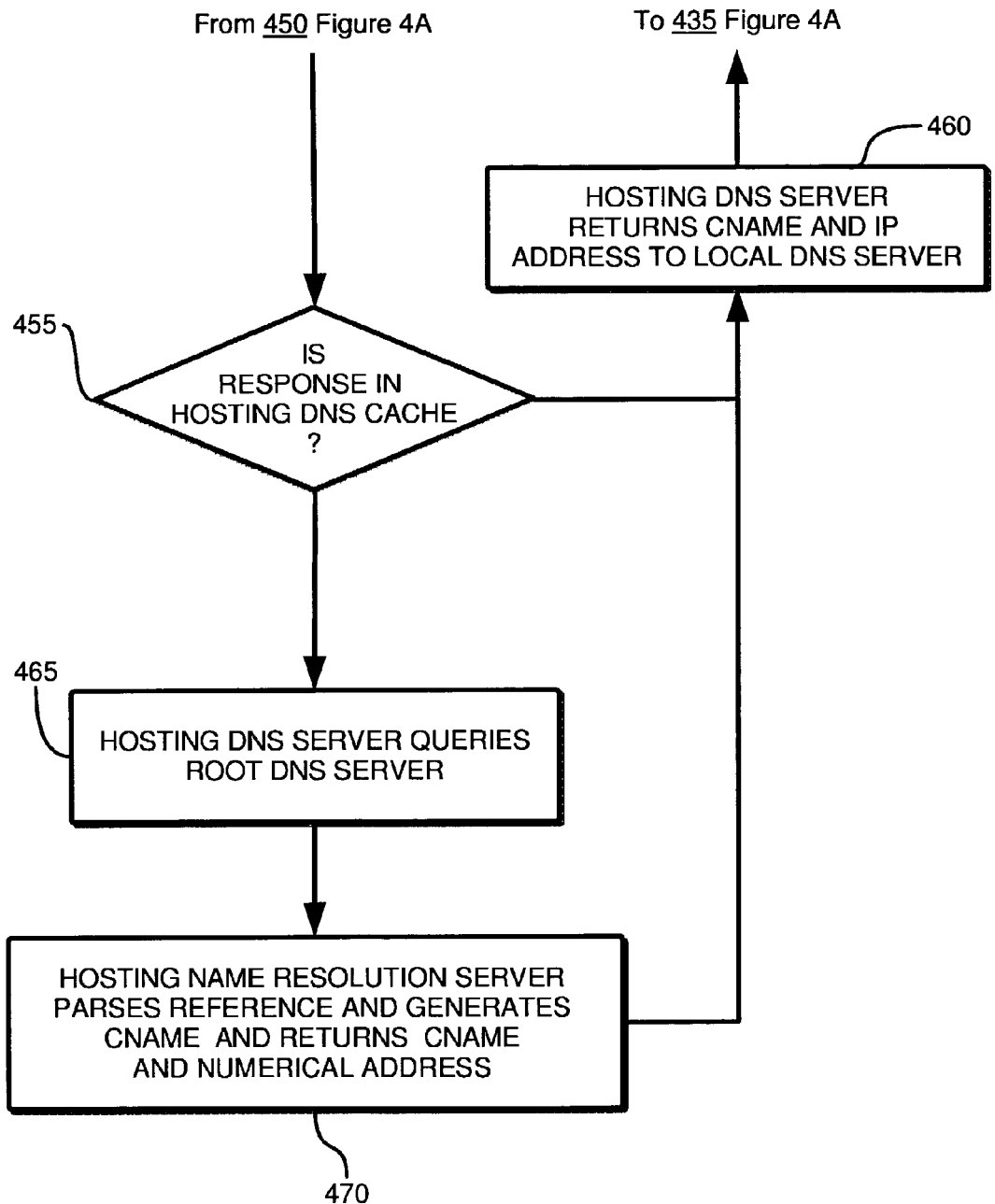

FIGS. 4A and 4B are flowcharts illustrating steps involved in completing a document retrieval from a remote server in accordance with embodiments of the invention. At step 410, a client network application, or browser, queries the local resolver to resolve a domain name into a numerical address. The resolver looks up its cache at step 415. If the result is found in the resolver's cache, which will occur if the same domain name has been looked up within a predetermined amount of time, the resolver returns the result (the IP or internet protocol) to the client browser at step 420. If the resolver does not have the domain numerical address in the cache, the resolver queries a proximal name resolution server at step 425. At step 430, the proximal name resolution server checks its cache to find whether it has the numerical address corresponding to the domain name in question. If the numerical address, or IP, is found, it is returned to the resolver at step 435. Otherwise, the proximal name resolution server queries the root server at step 440. The root server returns a reference to a host name resolution server at step 445. The reference returned by the root server may contain several references to sub-domains. In the latter case the proximal name resolution server may go through several iterations to resolve the reference returned by the root server, and obtain the numerical address to the host name resolution server.

The proximal name resolution server uses the reference information obtained from the root server to query the host name resolution server at step 450. The host name resolution server may have the result already cached and retrieve it at step 455. If the result is found in the cache, the result is returned to the proximal name resolution server at step 460. If the result is not stored in the cache, the host name resolution server dynamically generates the response. To resolve a domain name, the host name resolution server queries the root server, at step 465, to obtain the reference to the host name resolution server (to itself). At step 470, the host name resolution server parses the reference and computes a canonical name, to which it is commonly referred as a name. Computing the name may involve any number of rules for parsing and interpreting information stored in the reference to the name resolution server. For example, "isp.ext.jsmith.pages1.ns.joe.ext" and "isp.ext.jsmith.pages2.ns.joe.ext" may both be associated with the domain to be resolved, and may be returned along with their respective network addresses by a root server. The reference may include portions that have an indicator function, rather than a part of the domain name or the name. In the latter example, "ns" may indicate a separator between the hosting network information and the specific domain name information. The host name resolution server is able to determine, based on the numerical address, which literal address was used to reach it and determines that the name should take into account directing traffic to a specific location on the network. In embodiments of the invention, name resolution servers are placed in separate networks. If one name resolution server is reached, it may signify that the predecessor could not handle a request properly, and logically directs succeeding requests to backup hosting servers. For example, pages1 and pages2 could indicate separate zones in a host network and may even indicate two completely separate networks. Thus, embodiments of the invention provide an inherent failover solution i.e. when one host system is not functioning properly, a second system is called into action automatically. Similar inherent properties may also support load balancing between separate network zones or between different networks.

Figure 5:
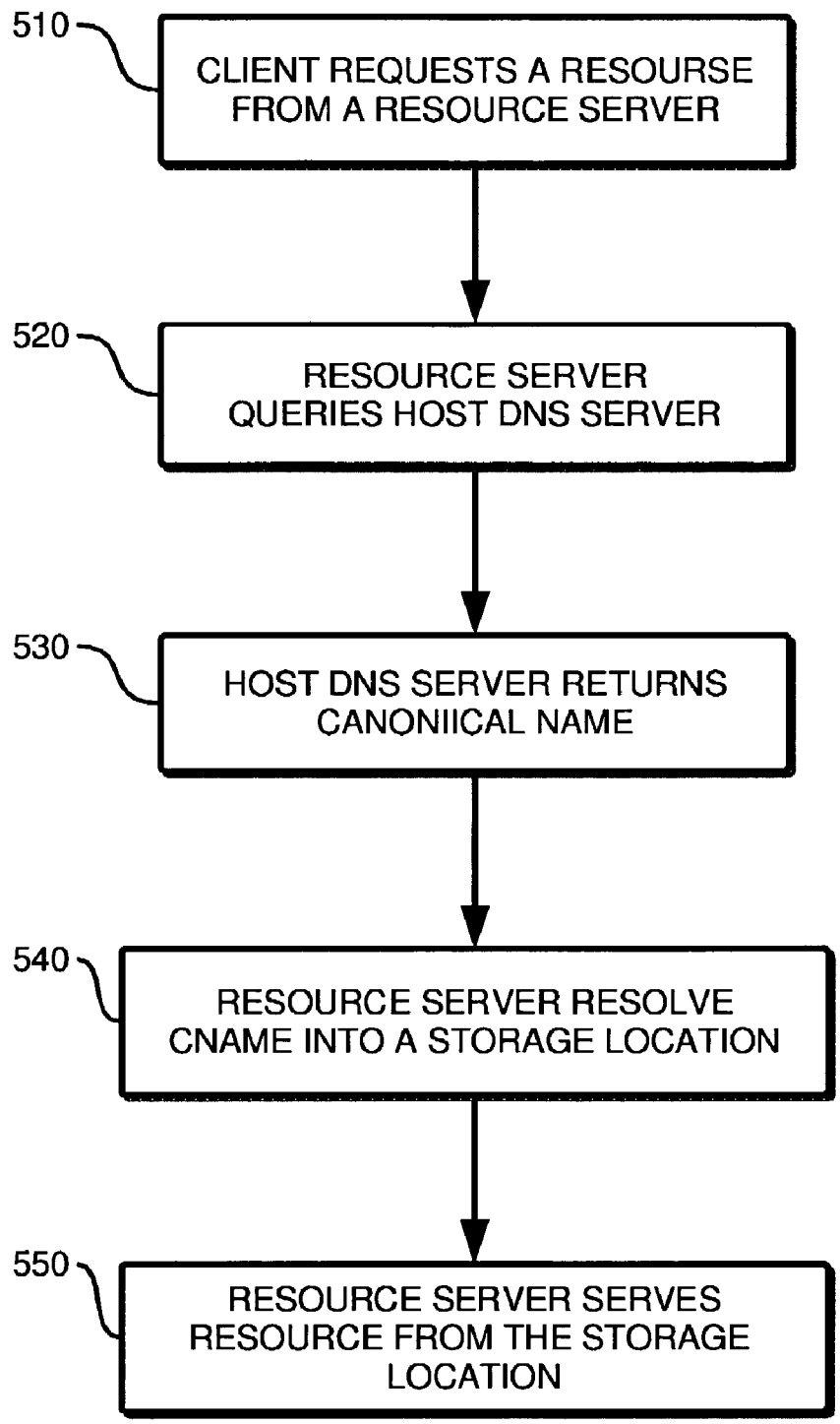
FIG. 5 is a flowchart illustrating involved in resolving a resource location by a server, in accordance with embodiments of the invention.

FIG. 5 is a flowchart illustrating the process involved in resolving a resource location by a server, in accordance with embodiments of the invention. At step 510, a client requests a resource from a resource server. When a user requests access to a resource located on a networked resource server, the client application first resolves the domain name of the resource location into a numerical address and then submits a request to the resource server for the resource. In accordance with several standards (e.g., Hypertext Transfer Protocol, HTTP), the request contains the resource name and the domain. For example, when the user enters the uniform resource locator "http://www.joe.ext/resource_name.html indicates" into a web browser, the web browser resolves the domain name "www.joe.ext" into a numerical address (e.g. 1.2.3.4) and then connects to the resource server located at 1.2.3.4 (through the standard port 80 for HTTP). Next, the web browser submits a request that contains, among other information, the domain name and the resource name and/or path. In embodiments of the invention, the resource server maps the domain name in the request to a name that indicates where or how to provide the requested resource.

Embodiments of the invention are enabled to query a name resolution server to resolve the domain name that is submitted with the query for the resource. For example, a computer program module may be implemented in any embodiment of the invention to perform the name resolution on behalf of any service network application. In one embodiment a module is incorporated with a hypertext transfer protocol based server to take in charge the name resolution of the queried domain name (e.g., www.joe.ext). At step 520, the resource server queries a name resolution server, or host DNS server, (e.g. a host name resolution server such as 130). Embodiments of the invention may follow every step, as previously described, to resolve a domain name, including querying the root name server and then the host name resolution server. However, embodiments of the invention may be configured to utilize name resolution services on their proximal name resolution servers. At step 540, the name resolution server returns the canonical name (as previously described) and optionally a numerical address of the resource server. The resource server parses the canonical name and extracts the information that indicates the storage location of the resource. For example, the canonical name may be, for the domain name "www.joe.ext", "jsmith.pages1.isp.ext". The resource server interprets the canonical name as pointing to a storage location (e.g., /www/users/jsmith). At step 550, the server fetches the resource from the storage location and serves it to the client.

Figure 6:
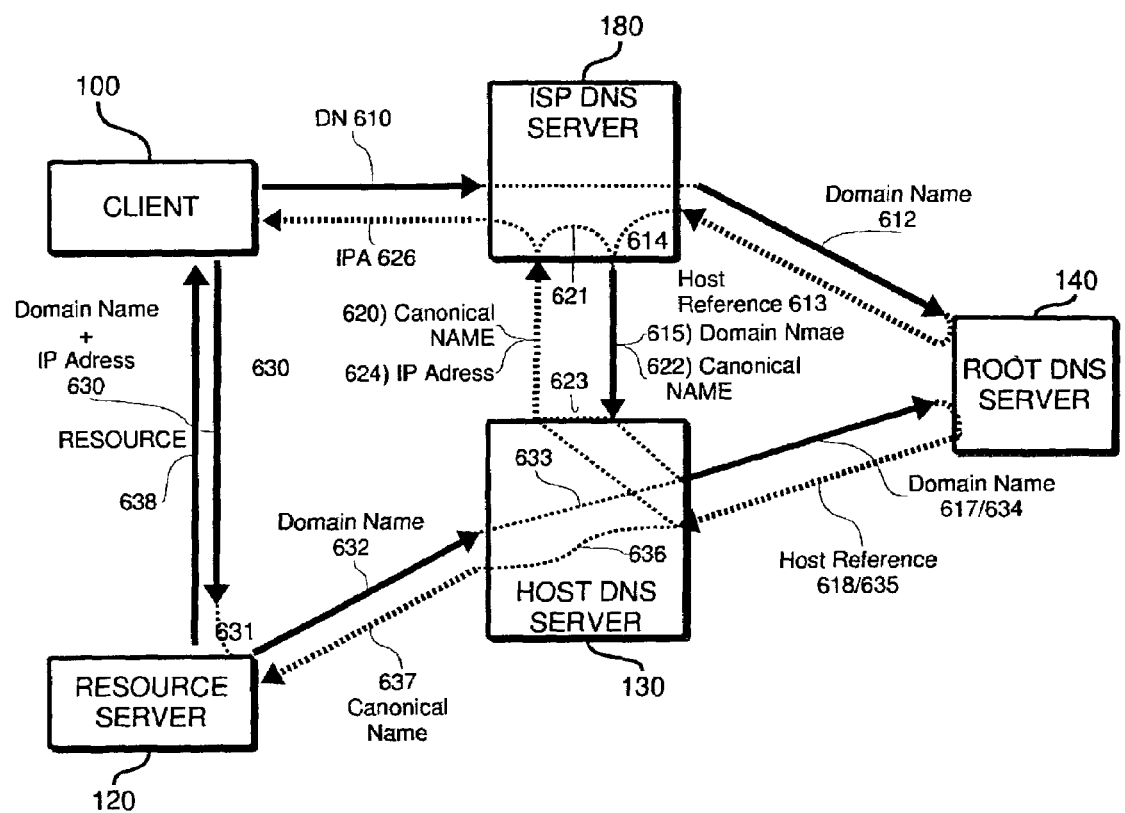
FIG. 6 is a block diagram illustrating name resolution nodes and the connections underlying name resolution in systems embodying the invention.

FIG. 6 is a block diagram illustrating name resolution nodes and the connections underlying name resolution in systems embodying the invention. In embodiments of the invention, the network reference, associated with the name resolution server for a particular name of a network location, comprises one or more parts that are interpreted by clients (in this case clients comprise network applications and any name resolution service). For example, in an Internet Protocol based network, a domain name such as "joe.ext" may be associated with a domain name service reference called "isp.ext.jsmith.pages1.ns.joe.ext".

In an embodiment of the invention, when a client 100 requires a name resolution, it makes a query 610 to a proximal name resolution server 180 that conducts the rest of the name resolution on behalf of the client. For example, a user on client 100 attempts to access a resource served on a server referred to as "www.joe.ext". The proximal name resolution server may send a response 626 to the query providing the canonical name and/or the numerical address associated with the domain name if the response exists in the proximal name resolution server cache. In embodiments of the invention, the proximal name resolution server is enabled to iterate through the domain name, and attempts to resolve significant portions of the domain name. If the response is not available in the proximal name resolution server cache, the proximal name resolution server sends a query 612 to the root server 140. The root server 140 returns a response 613 to the proximal name resolution server. The response from the root server typically contains the numerical address and textual reference of the host name resolution server 130. In embodiments of the invention, the textual reference of the host name resolution server contains multiple parts. For example, a request to resolve the domain name "www.joe.ext" directed to the root server may cause the root server to return a host name resolution reference that contains at least "isp.ext.jsmith.pages1.ns.joe.ext". The proximal name resolution server 180 utilizes the numerical address obtained from the root server to send a query 615 to the host DNS name resolution server 130. Name resolution protocols do not necessarily support sending the textual information about the name resolution server. The host name resolution server may send a query 617 to the root DNS name server 140 and request a resolution for the name that was submitted for resolution. The root name resolution server 140 returns a response 618 containing the host name resolution server's reference. The host DNS name resolution server 130 parses the textual reference and generates a canonical name corresponding to the domain name that was submitted. For example, if the root name server returns "isp.ext.jsmith.pages1.ns.joe.ext", the host name resolution server 130 may generate a canonical name "jsmith.pages.isp.ext". The canonical name is returned in a response 620 to the proximal name resolution server. The proximal name resolution server checks the response 621 to determine whether it contains a numerical address. If the response does not contain a numerical address, the proximal name resolution server submits another request 622 to the host name resolution server to resolve the canonical name into a numerical address 623. The host name resolution server parses the canonical name and determines the numerical address associated with the canonical name. In embodiments of the invention, canonical names may not all have a stored mapping. The host name resolution server examines the canonical name and may determine that the resource host belongs to a zone of the network that is associated with one or more numerical addresses. For example, a host name resolution receives a name "jsmith.pages.isp.ext" that does not have a stored explicit mapping. The host name resolution server is capable of parsing the previously generated canonical name and determining that the numerical address corresponds to the numerical address of the server named "pages.isp.ext". In this event, it returns a response 624 to the proximal name resolution server 180 that, in turn, returns the resolution result 626 to the client.

In embodiments of the invention, the client submits a query 630 to access a resource stored on a resource server 120. Following the above example, the query requests access to the domain name "www.joe.ext/resourcename.html". The resource server is enabled to retrieve information about the domain name from the name resolution servers 180. In the latter example, the resource server submits a request 632 to the host name resolution server 130 (e.g. host DNS server). The name resolution server checks 633 to determine whether the result exists in a cache. The host name resolution server may issue a query 634 to the root server 140. The root server then returns a reference 635 to the name resolution server associated with the domain name. The host name resolution server then dynamically generates 636 a canonical name and returns it 637 to the resource server 120. The resource server then parses the name to extract information about the resource location. For example, the resource server may determine, following the previous example, that the path to the resource on the storage device is "/www/users/jsmith". The resource server retrieves the resource and serves it the client 638.

Thus, a method and apparatus has been disclosed for resolving network location names by dynamically generating a canonical name containing specific information about one or more resources on a resource server, without requiring the use a database of mappings between the generated names and numerical addresses.

The invention claimed is:

1. A method performed in a first name server, the method comprising:
    sending, to a second name server, a name resolution query for a resource, the resource comprising a first domain name;
    receiving a reply to the query, the reply comprising a multi-part textual reference associated with the first name server, wherein said multipart textual reference comprises at least the first domain name, second domain name, and a resource location reference;
    dynamically generating a multi-part canonical name from said multi-part textual reference, said multi-part canonical name comprising the second domain name and the resource location reference; and
    resolving said canonical name into a numerical address.

2. The method in claim 1 wherein said multi-part textual reference further comprises at least two dot-separated text strings.

3. The method in claim 1 wherein said multi-part textual reference complies with a Internet Protocol naming standard.

4. The method in claim 1 wherein said obtaining said multi-part textual reference further comprises making a request to a root domain name server to resolve a domain name.

5. The method in claim 1 wherein said first host domain name appears as a sub-domain in said multi-part textual reference.

6. The method in claim 1 wherein said first resource location reference further comprises at least one text string.

7. The method in claim 1 wherein said first host domain reference and said second host domain reference are identical.

8. The method in claim 1 wherein said first host domain reference and said second host domain reference are different.

9. The method in claim 1 wherein said first resource location reference and said second resource location reference are identical.

10. The method in claim 1 wherein said first resource location reference and said second resource location reference are different.

11. A method, performed by a hosting service having a first domain name, comprising:
    receiving a second domain name, different than the first domain name, and a resource storage location;
    generating a textual name server reference based on the second domain name and the resource storage location, the textual name server reference comprising at least two parts, wherein said at least two parts comprises a first part corresponding to the resource storage location, and a second part corresponding to the first domain name; and
    registering the second domain name and a numerical address of a name server for the hosting service, in association with the textual name server reference, with a central authority.

12. The method in claim 11 wherein said textual reference further comprises a third part indicating a registered domain name.

13. The method in claim 11 wherein said textual reference further comprises a reference to a domain name resolution server.

14. The method in claim 11 wherein said textual reference further comprises a multi-string dot-separated text reference.

15. The method in claim 14 wherein said multi-string dot separated text reference complies with Internet Protocol standards.

16. In a network environment, a method for providing name resolution services comprising:
    registering a textual reference and a numerical address with a central authority in association with a first domain name, the textual reference comprising a first part and a second part, the first part indicating a network resource location, the second part indicating a hosting domain name different than the first domain name;
    obtaining said textual reference in reply to a query to a name resolution server;
    dynamically generating a multi-part canonical name from said multi-part textual reference, said multi-part canonical name comprising the network resource location and the hosting domain name;
    resolving said canonical name into a numerical address;
    receiving a request for a resource located on a resource server, wherein said request comprises access to said resource on said first domain name;
    obtaining said multi-part canonical name; and
    obtaining an access resource location to said resource by parsing said dynamically generated multi-part canonical name.

17. A method performed in a first name server located in a hosting network, the method comprising the steps of:
    receiving a name resolution query for a resource server;
    sending the name resolution query to a second name server;
    receiving a reply from the second name server, the reply comprising a multi-part textual reference associated with the first name server;
    parsing the multi-part textual reference into a distinct first, a second, and third part, the first part corresponding to the resource server, the second part naming a domain, and the third part identifying a resource location within the hosting network; and generating a multi-part canonical name containing second part and the third part.

18. The method of claim 17, wherein the second name server is a root name server.

19. The method of claim 17, wherein the multi-part canonical name does not contain the first part.

20. The method of claim 17, wherein the domain named in the second part of the multi-part textual reference is different than the domain of the resource server in the name resolution query.

21. The method of claim 17, further comprising the step of:

resolving the canonical name into a numerical address.

22. The method of claim 21, further comprising the step of:

replying to the name resolution query with the resolved numerical address.

23. The method of claim 17, further comprising the step of:

receiving a name resolution query for a resource server located in the hosting network.

24. The method of claim 23, wherein the first part corresponds to the resource server, the second part corresponds to the domain name of the hosting network, and the third part identifies a resource location within the hosting network.

25. The method of claim 1, wherein the multi-part textual reference identifies the first name server.

26. The method of claim 1, wherein the multi-part textual reference is associated with the first name server through a registration of the first name server as a name server for the resource server.

27. The method of claim 1, wherein the multi-part textual reference is associated with the first name server through a registration of the first name server as an authoritative name server for the resource server.

* * * * *